(12) United States Patent
Polo Sanchez

(10) Patent No.: US 6,240,575 B1
(45) Date of Patent: Jun. 5, 2001

(54) EVACUATION SYSTEM PROVIDED WITH A SHUT-OFF VALVE, AND PROCESS FOR MAINTAINING IN OPERATING CONDITIONS A SHUT-OFF VALVE IN A VACCUM EVACUATION SYSTEM

(75) Inventor: Vicente Polo Sanchez, Barcelona (ES)

(73) Assignee: Tecnicas Modulares e Industriales S.A. (ES)

(*) Notice: Subject to any disclaimer, the term of this patent is extended or adjusted under 35 U.S.C. 154(b) by 0 days.

(21) Appl. No.: 09/445,789
(22) PCT Filed: Jun. 11, 1998
(86) PCT No.: PCT/ES98/00170
  § 371 Date: Jan. 13, 2000
  § 102(e) Date: Jan. 13, 2000
(87) PCT Pub. No.: WO98/56996
  PCT Pub. Date: Dec. 17, 1998

(30) Foreign Application Priority Data

Jun. 12, 1997 (ES) .................................................... 9701286

(51) Int. Cl.⁷ .............................. E03F 1/00; E03D 5/00; F16K 5/04
(52) U.S. Cl. .................................... 4/434; 4/431; 137/242
(58) Field of Search .................... 4/431–435; 137/242, 137/244, 330

(56) References Cited

U.S. PATENT DOCUMENTS

| | | | |
|---|---|---|---|
| 2,315,058 | * 3/1943 | Holt, II et al. | 137/242 |
| 3,984,080 | * 10/1976 | Varis et al. | 4/434 |
| 4,020,864 | * 5/1977 | Church, Jr. | 137/242 |
| 4,826,132 | * 5/1989 | Moldenhauer | 137/242 |
| 5,271,105 | * 12/1993 | Tyler | 4/431 |

FOREIGN PATENT DOCUMENTS 584 031 A2 * 2/1994 (EP).
90/11415 * 10/1990 (WO).

* cited by examiner

Primary Examiner—Charles R. Eloshway
(74) Attorney, Agent, or Firm—Steinberg & Raskin, P.C.

(57) ABSTRACT

The toilet discharge system includes a valve with a body (1) and a shutter member (2), and an unblocking apparatus for the shutter member which acts to displace the shutter between the closing position and an auxiliary position and to return it subsequently to the closing position. Advantageously, the shutter member is a rotating element, and its displacement takes place along the direction of its rotation axis; the unblocking apparatus can include a pneumatic system which injects air into two chambers (6, 7) defined between the valve body (1) and the shutter member (2), on two opposite sides of the latter. The method of operation consists in submitting the shutter member of the valve to a cycle which includes a displacement between the closing position and an auxiliary position, and subsequent return to the closing position. The shutter member is thereby prevented from becoming blocked, by avoiding formation of scale of lime and the like, and lubrication and cleanliness of the valve are improved.

9 Claims, 1 Drawing Sheet

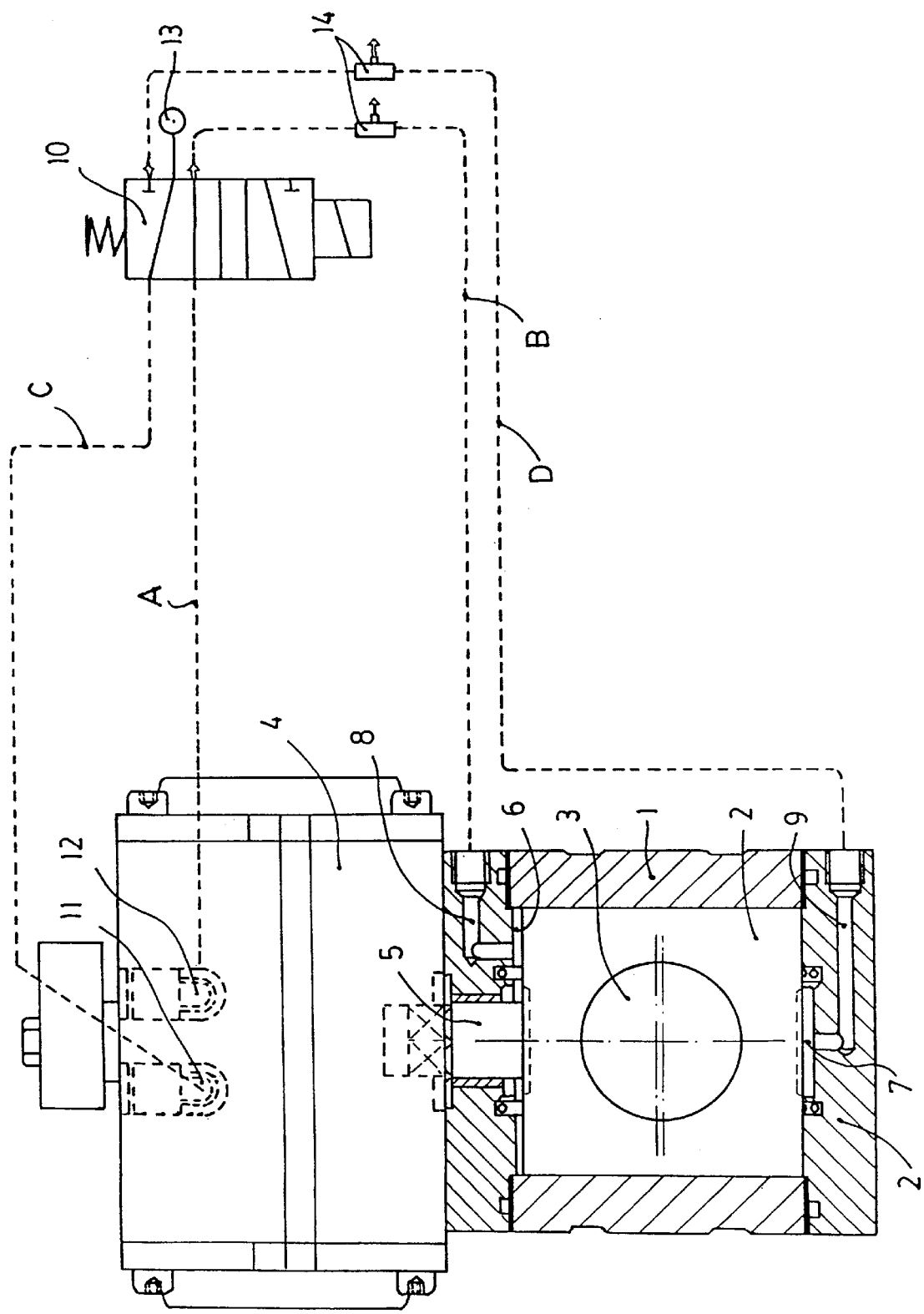

EVACUATION SYSTEM PROVIDED WITH A SHUT-OFF VALVE, AND PROCESS FOR MAINTAINING IN OPERATING CONDITIONS A SHUT-OFF VALVE IN A VACCUM EVACUATION SYSTEM

The present invention relates to a vacuum toilet discharge system, provided with a shutoff valve, in which the risk of blocking of the shutter member of the valve by scale, lack of lubrication, etc. is prevented.

The invention also relates to a method for keeping operative a shutoff valve of a vacuum toilet discharge system.

BACKGROUND OF THE INVENTION

Vacuum toilet discharge systems often present problems because their components become stuck together, following different periods of inactivity. One of the components which usually suffers most in this respect is the shutoff valve. This is usually due to the fact that the substances which are in the water, such as lime and the like, often build up scale between the fixed and moving parts of the valve, hindering or even blocking its operation; moreover, if solid particles come between the fixed and moving parts the operation of the valve can become defective, leading to leaks, defective movements, abrasion, etc.

Where a toilet discharge system remains inactive for some time, the shutter member of the shutoff valve can easily adhere to its housing due to the remains of lime and the like, so that in the next operation cycle the normal driving system does not have sufficient force to move the shutter member; in such cases, the valve remains inoperative and has to be disassembled for cleaning, with the attendant disadvantages of down-time due to breakdown, labour cost, etc.

Another disadvantage of toilet discharge systems having valves with a moving part is that lubrication of the unit is sometimes insufficient, and this also has a negative effect on operation of the valve.

One example of a toilet discharge system with shutoff valve to which this invention can be applied is described in Spanish patent ES-A-2072176, in the name of the same Applicant.

OBJECTS AND SUMMARY OF THE INVENTION

This invention has been developed in order to solve the disadvantages mentioned above, while also presenting other advantages, as will be explained below.

With this purpose, the vacuum toilet discharge system of the invention is provided with a shutoff valve which connects a bowl with a waste water reservoir, said valve including a valve body inside which is mounted a shutter member which can be driven between an opening position and a closing position of the valve, and is characterized in that it includes unblocking means for the shutter member which act to cause a displacement of the shutter member between the closing position and an auxiliary position, and the subsequent return of the shutter member to the closing position.

The valve and the toilet discharge system are always kept operative, since the displacement of the shutter member hinders the deposition of calcareous remains and the like on the walls, or between the body and the shutter member; if a small amount of scale forms, the force of the displacement of the shutter member is able to release it.

Moreover, this toilet discharge system prevents particles from penetrating between the valve body and shutter member, and thereby improves cleaning of the unit.

A third advantage presented by the described toilet discharge system with shutoff valve is that it facilitates good lubrication of the unit, since the lubricant flows regularly in metered amounts towards the wall of the valve thanks to the aforesaid displacement.

In a preferred embodiment of the toilet discharge system of the invention, the shutter member is a rotating element with a transverse through passage, displacement of the shutter member between the closing position and the auxiliary position taking place along the direction of the shutter member rotation axis.

The lineal displacement is much more vigorous than the normal rotation of the shutter member, thus being capable of moving the shutter member even if the latter is blocked, for example, by scale.

Advantageously, the unblocking means include a pneumatic system which injects air alternately into two chambers defined between the valve body and the shutter member, on two opposite sides of the latter; in the case of the rotating shutter member, the chambers are an upper chamber and a lower chamber, defined respectively above and below the shutter member, the upper chamber being an annular chamber formed around a rotating drive shaft of the shutter member and the lower chamber being a circular chamber.

Preferably, the two chambers are connected to sources of pressurized fluid through a two-position distribution valve, which in one position connects one of the chambers with a source of pressurized fluid and in the other position connects the other chamber with a source of pressurized fluid.

In one particular embodiment, the displacement of the shutter member between the closing position and the auxiliary position is of approximately 0.8 mm.

This small distance is sufficient to cause the release of the shutter member.

The present invention also provides a method for keeping operative a shutoff valve in a vacuum toilet discharge system, said valve including a valve body inside which is a shutter member which can be driven between an opening position and a closing position of the valve, characterized in that the shutter member is submitted to a cycle which includes a displacement between the closing position and an auxiliary position, and a subsequent return to the closing position.

With this method it is possible to prevent a shutoff valve from becoming blocked by scale or particles, while lubrication thereof is improved, so that the valve and the toilet discharge system are always in perfect operating condition.

Advantageously, said cycle is implemented before driving the valve between the closing position and the opening position, in each operation of the valve; alternatively, said cycle is implemented at predetermined intervals.

If the cycle is implemented at intervals, the valve never becomes stuck and always remains clean and well lubricated; in some cases, however, this periodic functioning will not be needed, and it will be sufficient to carry out the cycle in association with each operation of the valve.

BRIEF DESCRIPTION OF THE DRAWINGS

For a better understanding of all that has been set out, some drawings are attached which show, schematically and solely by way of non-restrictive example, a practical case of embodiment.

In said drawings, the single FIGURE shows an embodiment of a shutoff valve in a toilet discharge system of the invention, partially in section and connected to a distribution valve for controlling the displacement of the shutter member.

DESCRIPTION OF A PREFERRED EMBODIMENT

The shutoff valve 1 shown in the Figure is made up of a valve body 1 inside which is housed a rotating shutter member 2 of substantially cylindrical shape.

The valve pertains to a vacuum toilet discharge system, and connects a toilet bowl to a waste water reservoir, as described in the aforesaid Spanish patent ES-A-2072176.

The shutter member 2 has a transverse through passage 3 formed in it, so that fluid flow through the valve is open or closed depending upon its angular position.

On the valve can be seen a block 4 which contains the means for driving the shutter member 2 in rotation; the rotation is transmitted to the shutter 2 through a driving shaft 5.

In accordance with the invention, above and below the shutter member 2 are defined an upper 6 and a lower 7 chamber, formed partly in the valve body 1 and partly in the shutter member 2 itself. The upper chamber 6 is annular and lies around the driving shaft 5, while the lower chamber 7 is substantially circular. The driving shaft 5 is mounted in such a way as to allow slight axial movement.

Two ducts 8 and 9 formed in the valve body 1 connect the chambers 6 and 7, through a two-position and five-port distribution valve 10, to sources of pressurized fluid 11, 12, which in this specific case are in the block 4 and are sources of pressurized air.

Silencers 14 can be arranged along lines B and D.

The operation of the valve described is as follows.

The shutter member 2 is normally in the closing position shown in the figure, and the distribution valve 10 connects the upper chamber 6 with the source of pressurized air 12 through lines A and B; the other source 11 is shut by a blind duct. The shutter member is kept in this closing position, in which the upper chamber 6 has maximum extension and the lower chamber 7 has minimum extension.

In order to carry out an operation of displacement of the shutter member, the position of the distribution valve 10 is shifted, in such a way that the source 12 is shut by the blind duct 13 and the lower chamber 7 is connected with the source 11 through lines C and D. This displaces the shutter member 2 upwards, to an auxiliary position in which the upper chamber 6 has a minimum extension and the lower chamber 7 has a maximum extension. This displacement can, for example, be of approximately 0.8 mm. Once the auxiliary position has been reached, the distribution valve 10 switches again and the shutter member 2 therefore returns to the closing position.

This mode of operation largely prevents the formation of deposits or scale of lime and the like on the valve, so that it is always kept operative. The displacement of the shutter member also facilitates lubrication of the unit and improves cleaning thereof, because the air entrains to the exterior particles which could have penetrated between the body 1 and the shutter 2.

This operation further manages to displace the shutter member 2, even if it has become blocked by particles or by a small amount of scale on the walls in contact with the valve body 1, which would not be achieved by its own rotating movement.

Under another aspect, the invention relates to a method for keeping a shutoff valve operative. This method consists in submitting the shutter member of a shutoff valve of any type to a cycle which includes displacement between the closing position and an auxiliary position, and subsequent return to the closing position; this cycle can be repeated at certain intervals or it can be carried out only before each operation of the valve.

Despite the fact that this specification has described a specific embodiment of the shutoff valve according to the invention, it is clear that the invention covers a large number of possible variants, all of them included within the sphere of protection set out in the attached claims.

What is claimed is:

1. A vacuum toilet discharge system provided with a shutoff valve which connects a toilet bowl with a waste water reservoir, said valve including a valve body (1) inside which is mounted a shutter member (2) which can be driven between an opening position and a closing position of the valve, wherein it includes unblocking means for the shutter member (2) of the valve, which act to cause a displacement of the shutter member between the closing position and an auxiliary position, and the subsequent return of the shutter member (2) to the closing position.

2. A toilet discharge system as claimed in claim 1, wherein said shutter member (2) is a rotating element with a transverse through passage (3), with displacement of the shutter member between the closing position and the auxiliary position taking place along the direction of the shutter member rotation axis.

3. A toilet discharge system as claimed in claim 2, wherein said chambers are a first chamber (6) and a second chamber (7), the fist chamber (6) being an annular chamber formed around a rotating drive shaft (5) of the shutter member (2) and the second chamber (7) being a circular chamber.

4. A toilet discharge system as claimed in claim 1, wherein said unblocking means include a pneumatic system which injects air alternately to two chambers (6,7) defined between the valve body (1) and the shutter member (2), on two opposite sides of the latter.

5. A toilet discharge system as claimed in claim 4, wherein said two chambers (6,7) are connected to sources of pressurized fluid (11,12) through a two-position distribution valve (10), which in one position connects one of the chambers (6) with a source of pressurized fluid (12) and in the other position connects the other chamber (7) with a source of pressurized fluid (11).

6. A toilet discharge system as claimed in claim 1, wherein the displacement of the shutter member (2) between the closing position and the auxiliary position is of approximately 0.8 mm.

7. A method for keeping operative a shutoff valve in a vacuum toilet discharge system, said valve including a valve body (1) inside which is a shutter member (2) which can be driven between an opening position and a closing position of the valve, wherein the shutter member (2) is submitted to a cycle which includes a displacement between the closing position and an auxiliary position, and a subsequent return to the closing position.

8. A method as claimed in claim 7, wherein said cycle is implemented before operating the valve between the closing position and the opening position, in each operation of the valve.

9. A method as claimed in claim 7, wherein said cycle is implemented at predetermined intervals.

* * * * *

UNITED STATES PATENT AND TRADEMARK OFFICE
CERTIFICATE OF CORRECTION

PATENT NO.   : 6,240,575 B1  
DATED        : June 5, 2001  
INVENTOR(S)  : Vincente Polo Sanchez Page 1 of 1

It is certified that error appears in the above-identified patent and that said Letters Patent is hereby corrected as shown below:

<u>Title page,</u>
Item [54], in the Title "VACCUM" should read -- VACUUM --.

Signed and Sealed this

Thirtieth Day of April, 2002

*Attest:*

*Attesting Officer*

JAMES E. ROGAN
*Director of the United States Patent and Trademark Office*